(12) United States Patent
Gay et al.

(10) Patent No.: US 11,675,332 B2
(45) Date of Patent: Jun. 13, 2023

(54) PRINTER FOR PRINTING A 3D OBJECT

(71) Applicant: CREATE IT REAL APS, Aalborg Ost (DK)

(72) Inventors: Jeremie Pierre Gay, Aalborg Ost (DK); Zoltan Tamas Vajda, Aalborg Ost (DK)

(73) Assignee: CREATE IT REAL A/S, Aalborg (DK)

( * ) Notice: Subject to any disclaimer, the term of this patent is extended or adjusted under 35 U.S.C. 154(b) by 0 days.

(21) Appl. No.: 16/967,335

(22) PCT Filed: Feb. 5, 2019

(86) PCT No.: PCT/EP2019/052727
§ 371 (c)(1),
(2) Date: Aug. 4, 2020

(87) PCT Pub. No.: WO2019/149953
PCT Pub. Date: Aug. 8, 2019

(65) Prior Publication Data
US 2021/0034038 A1 Feb. 4, 2021

(30) Foreign Application Priority Data
Feb. 5, 2018 (DK) .......................... PA 2018 70069

(51) Int. Cl.
*G05B 19/4099* (2006.01)
(52) U.S. Cl.
CPC ............ *G05B 19/4099* (2013.01); *G05B 2219/49023* (2013.01)
(58) Field of Classification Search
CPC .................. G05B 2219/49023; G05B 19/4099
See application file for complete search history.

(56) References Cited

U.S. PATENT DOCUMENTS 5,121,329 A 6/1992 Crump
5,276,383 A 1/1994 Nishimura et al.
(Continued)

FOREIGN PATENT DOCUMENTS

CA 2796369 A1 10/2011
JP H0784628 A 3/1995
(Continued)

OTHER PUBLICATIONS

Neuss, Printer control based on head alignment, 2000, google patents, translation of JP3907382B2 (Year: 2000).*
(Continued)

*Primary Examiner* — Rocio Del Mar Perez-Velez
*Assistant Examiner* — Yvonne Trang Follansbee
(74) *Attorney, Agent, or Firm* — Workman Nydegger

(57) ABSTRACT

A printer for printing a 3D object based on a computer model, the printer comprising a tool for extruding or solidifying material, a stage supporting layers of the object; motion structure defining the shape of the layers, and a controller configured to make a path to be followed for making the object. To increase at least one of the speed and the precision by which the object is made, the controller is configured to define the path by defining a plurality of line segments and by defining transition segment for insertion between the line segments. The controller is further configured to only demand material deposition along the line segments and not along the transition segments.

15 Claims, 16 Drawing Sheets

(56) References Cited

U.S. PATENT DOCUMENTS

Figure 1:
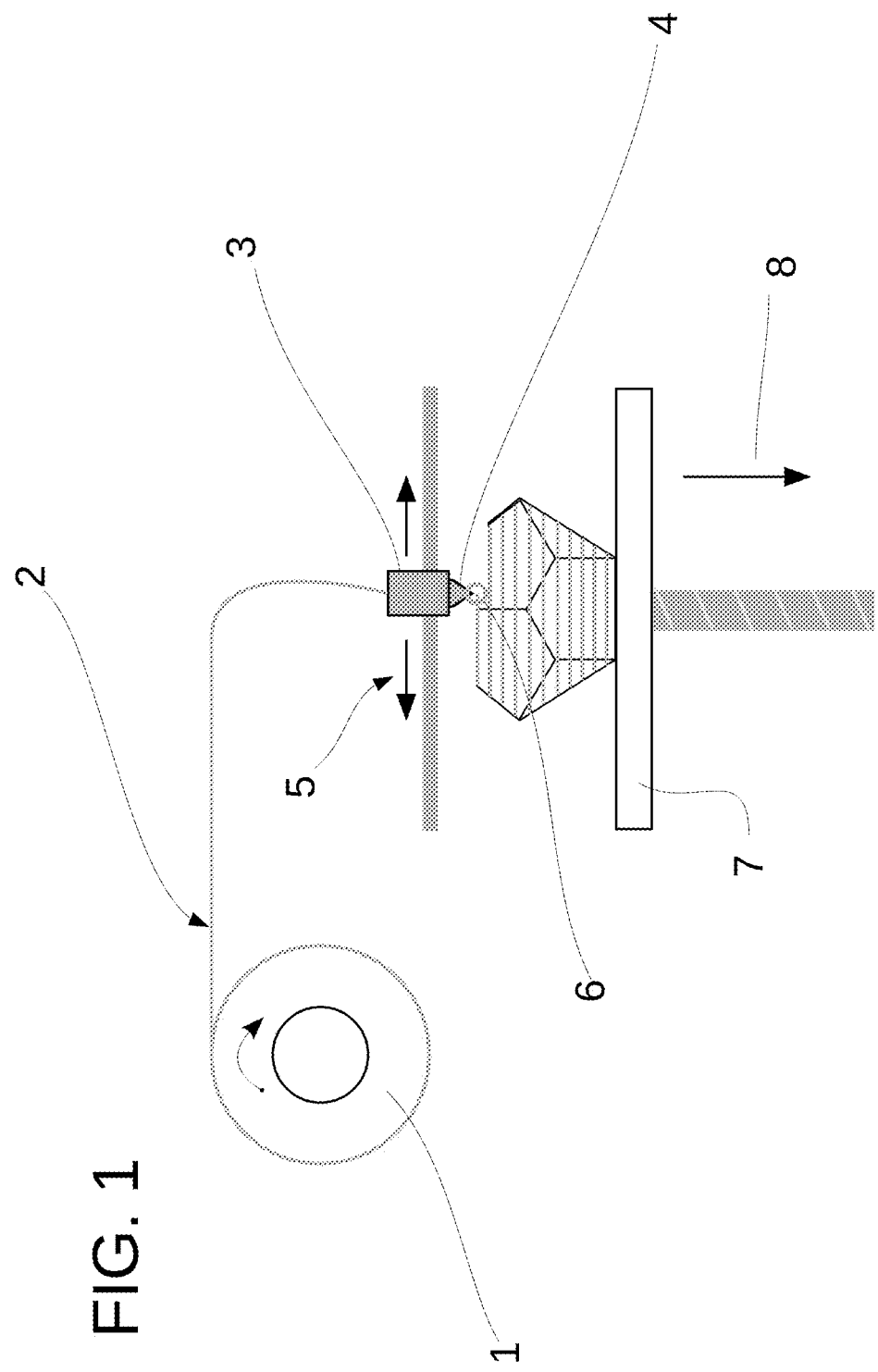

| | | | |
|---|---|---|---|
| 5,426,722 A | 6/1995 | Batchelder | |
| 5,550,448 A * | 8/1996 | Ferragina | G05B 19/41 |
| | | | 318/625 |
| 6,814,907 B1 | 11/2004 | Comb | |
| 10,324,454 B2 | 6/2019 | Maeda | |
| 10,493,562 B2 | 12/2019 | Dimter et al. | |
| 2001/0045526 A1* | 11/2001 | Itoh | H01J 37/20 |
| | | | 250/492.2 |
| 2002/0129485 A1 | 9/2002 | Mok et al. | |
| 2007/0085850 A1* | 4/2007 | Hong | G05B 19/4103 |
| | | | 345/442 |
| 2014/0328963 A1 | 11/2014 | Mark et al. | |
| 2016/0001401 A1 | 1/2016 | Dimter et al. | |
| 2016/0067928 A1 | 3/2016 | Mark et al. | |
| 2017/0266884 A1 | 9/2017 | Maeda | |
| 2018/0361671 A1* | 12/2018 | Bloome | B29C 48/92 |
| 2019/0126474 A1* | 5/2019 | Skogsrud | G05B 19/416 |
| 2019/0283329 A1* | 9/2019 | Lensgraf | B29C 64/112 |
| 2020/0023463 A1 | 1/2020 | Dimter et al. | |

FOREIGN PATENT DOCUMENTS

| | | | | |
|---|---|---|---|---|
| JP | 3907382 B2 * | 4/2007 | | B41J 2/2135 |
| JP | 2016517357 A | 6/2016 | | |
| JP | 2016531020 A | 10/2016 | | |
| JP | 2017165041 A | 9/2017 | | |
| WO | 2014125258 A2 | 8/2014 | | |
| WO | 2015009938 A1 | 1/2015 | | |
| WO | 2015051332 A1 | 4/2015 | | |
| WO | 2017189771 A1 | 11/2017 | | |

OTHER PUBLICATIONS

International Search Report and Written Opinion from PCT Application No. PCT/EP2019/052727, dated May 31, 2019.
Search Report from corresponding Danish Application No. PA 2018 70069, dated Sep. 12, 2018.
Office Action from corresponding Japanese Application No. 2020-563817, dated Nov. 8, 2020.

* cited by examiner

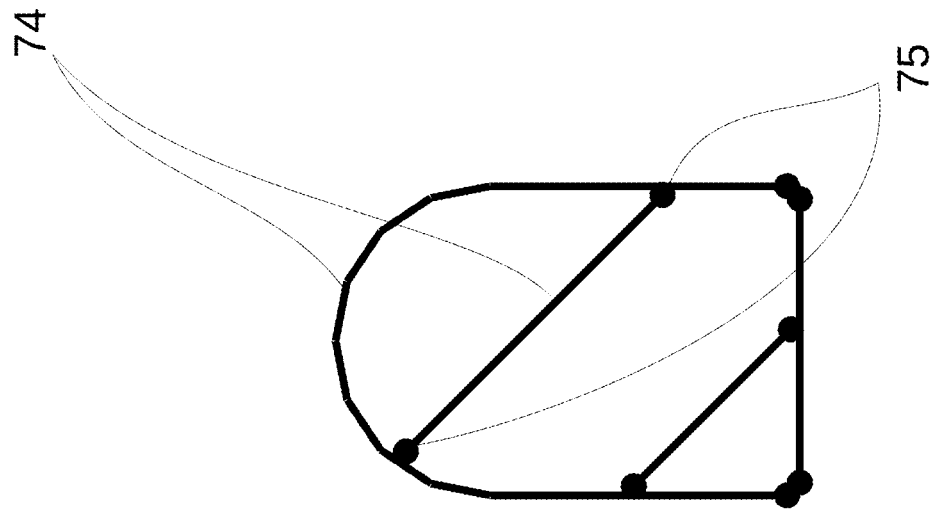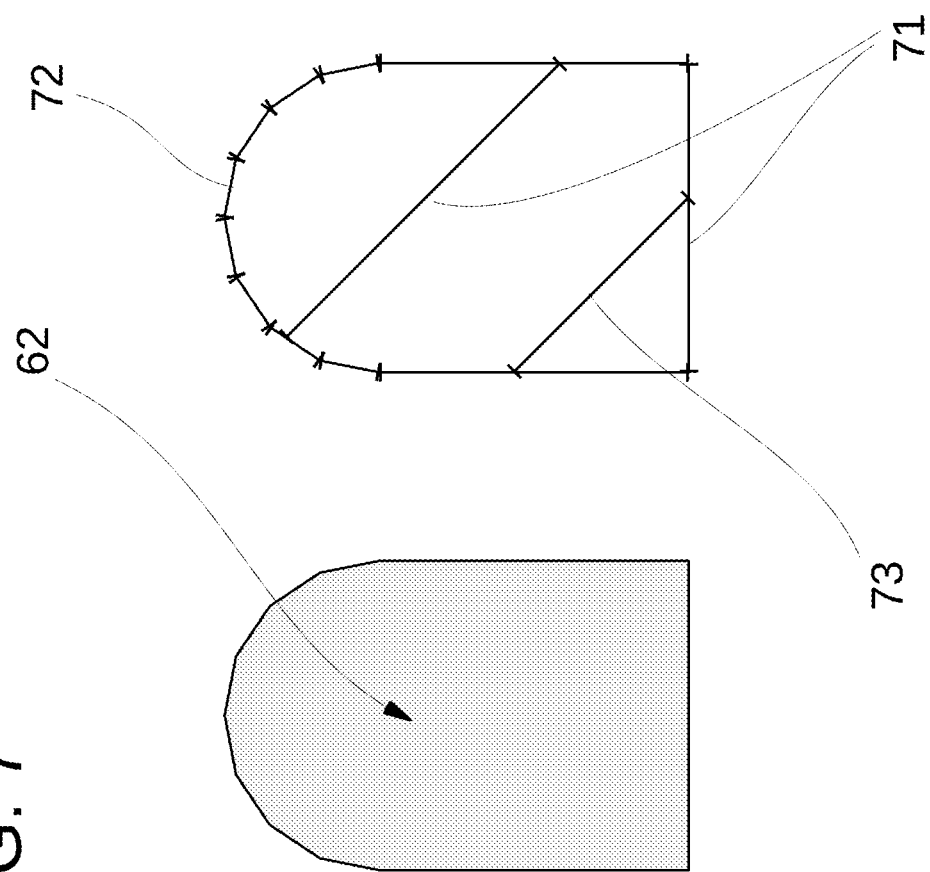
FIG. 7

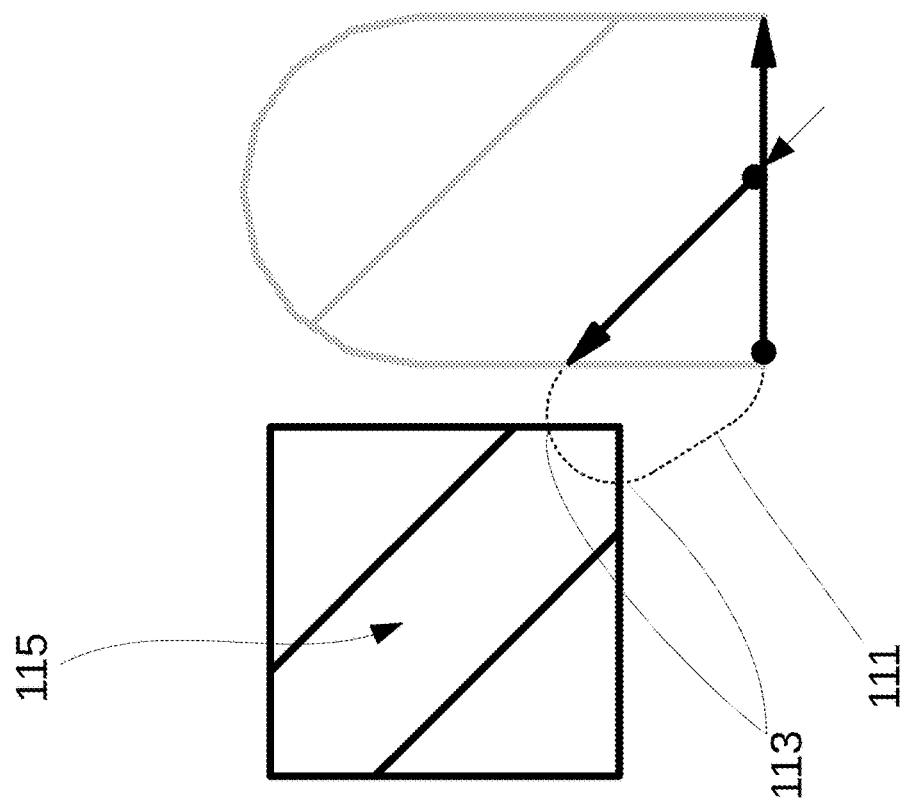
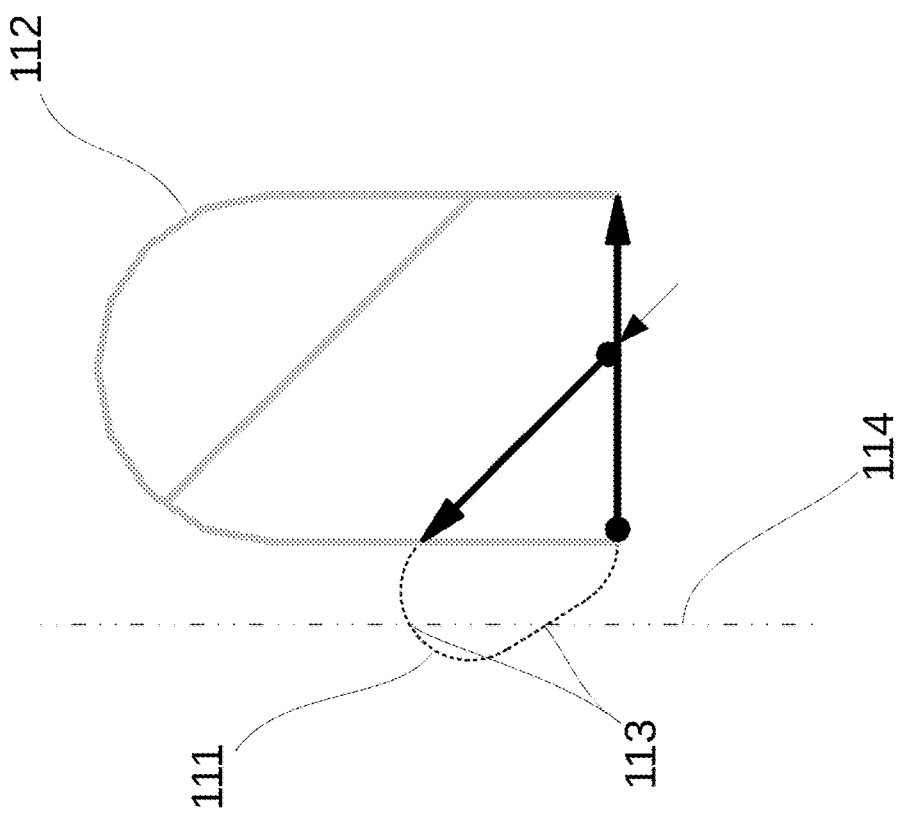
FIG. 11

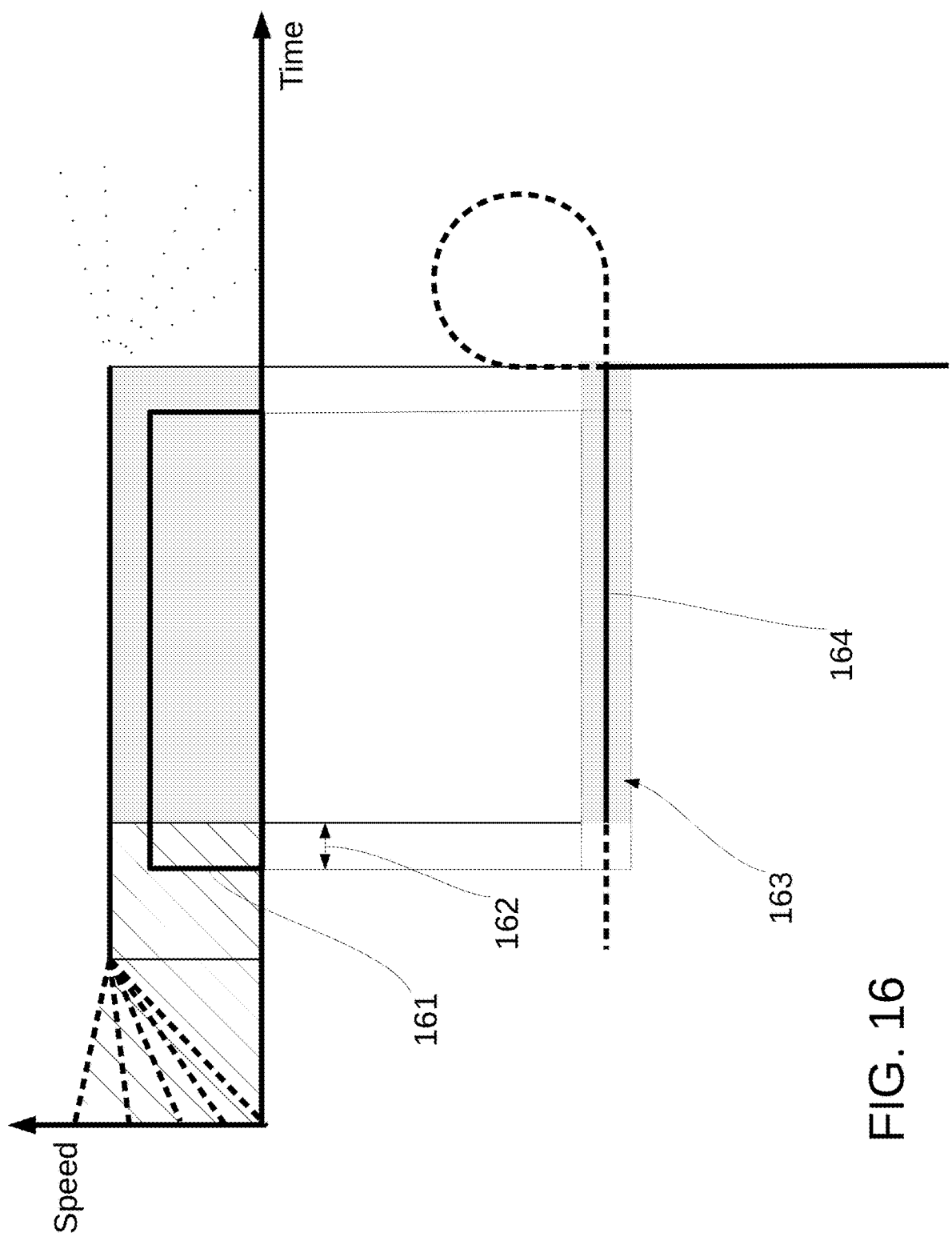

PRINTER FOR PRINTING A 3D OBJECT

INTRODUCTION

The present disclosure relates to a printer and a method for printing a 3D object based on a computer model. The printer to which the disclosure relates comprises a tool configured to shift between an activated and a deactivated state based on a tool command. In the activated state, it adds material to a particular position, herein referred to as an adding-position. The adding position is a position in a layer of the object. The adding-position is determined by a tool-position of a shape defining structure which is typically an integrated part of the tool. The printer further comprises a stage arranged to support the layer of the object while it is being defined by the tool. The printer further comprises a motion structure configured to receive motion commands and based thereon to define the shape of the layer by movement of the shape defining structure. The printer further comprises a controller configured to communicate with the tool and with the motion structure and being programmed to make the object by the communication with the tool and motion structure. The controller is programmed to receive shape data defining the shape of a layer of the object, to provide a path based on the shape data, and to provide motion commands and tool commands based on the path.

BACKGROUND OF THE INVENTION

Additive manufacturing (AM), commonly called 3D printing, is a technology which allows creation of objects from computer 3D drawings.

The process includes slicing a solid model to form 2D slices, and printing the object by making layers which each correspond to a slice. One by one, the layers are created by the printer such that one layer is arranged on top of the previous layer. Since each layer has a given thickness the real object gains volume every time a layer is added. Different types of technologies exist: extrusion based, granular based, light polymerization based, or lamination based. Each of the technologies uses different types of materials and different ways of making the layers, but they all apply the principle of guiding a tool, or a part of a tool, herein referred to as a shape defining structure, along a path defined from the slice of the solid model. During the process, the material is arranged in accordance with the shape of the slice. The material is typically a polymer, a metal alloy, a plaster, or a photopolymer.

In the known printers of this kind, the object is created on a stage, and the shape defining structure is moved relative to the stage. Often, the shape defining structure is moved by a manipulator and/or the stage is moved by an actuator. One or both of the manipulator and actuator may move in x, y, or z direction of a Cartesian space.

The most common extrusion based AM technology is Fused Deposition Modeling. This technology is sometimes referred to as FDM, and it has the equivalent name Fused Filament Fabrication FFF. The principle of this extrusion technology is to extrude melted material, usually thermo-polymer filament, while following a path defined from the slice, and layers of the object are thereby created. U.S. Pat. No. 5,121,329 provides an example of this technology.

A common granular based AM technology is Selective Laser Sintering (SLS) which is based on spherical polymer or metal powder elements being sintered together by laser. A layer of powder is applied, and the layers of the object are selectively sintered. Subsequently, a new layer of powder is applied and the process is repeated.

Another common granular based AM technology is Electron Beam Melting (EBM) which is a type of Selective Laser Melting (SLM) used for the direct manufacturing of fully dense metal parts by melting metal powder with an electron beam in high vacuum. The principle is generally identical to that of SLS but the metal powder is totally melted and not only sintered.

Powder bed and inkjet head 3d printing, is based on an inkjet print head selectively arranging a binding agent onto a bed of powder e.g. plaster.

The most common light polymerization technologies are:
Stereolithography (SLA) where photopolymer liquid resin is hardened by UV light or laser. The laser draws the shape of the path which is defined based on the slice and thereby creates a hardened layer. Subsequently, photopolymer liquid is added, and the shape of the subsequent slice is drawn by the laser until the object is created.

Digital Light Processing (DLP), in the additive manufacturing context, is similar to SLA where a DLP projector is applied instead of a UV light beam or laser to harden a photopolymer layer by layer.

The most common lamination based AM technology is Laminated Object Manufacturing (LOM) where sheets of a material, e.g. paper, plastic, or metal, are joined adhesively layer by layer and subsequently cut to define the shape of the object.

It is a general problem of 3D printing that at least one of the speed and quality is low. If the speed is increased, the tolerances may become unacceptable, and to obtain narrow tolerances, the speed must be reduced.

The existing devices will often cause overshoots and oscillations in the system for a certain amount of time. These oscillations will cause the tool to deviate from the prescribed path during the deposition of material causing the resulting object to have visible defects especially after sudden changes in the magnitude or direction of the motion for example at sharp edges. These defects are commonly referred to as "ringing". These defects get more pronounced as the motion parameters (speed, acceleration, and jerk) are increased in order to save print time. This behavior thus serves as a major bottleneck preventing machines using this technology from achieving fast and high quality prints.

DESCRIPTION OF THE INVENTION

It is an object of embodiments of the disclosure to provide a printer and a method for printing 3D objects faster and/or more precisely. According to these and further objects, the disclosure, in a first aspect, provides a printer, a controller for a printer, and a method of printing.

In the printer according to this disclosure, the controller is configured to define the path by carrying out the following steps, e.g. in the mentioned order:

a) Defining, based on the shape data, a plurality of line segments. By means of an example, 325 line segments could be defined. Each of the line segments constitutes a sub-path which is to be followed such that the adding-position is moved along the line segments, i.e. the position where the material is added by the tool should be moved along the line segments in order to create the desired shape of the layer.

b) Defining start points and end points for each line segment. This means that each line segment is assigned a direction in which the adding-position moves along the line segment from the start point to the end point.

c) Defining an order of the line segments to thereby define a list of contiguous line segments. This could e.g. be 1-2-3-4 specifying that 1 is to be followed first, subsequently number 2, then number 3, then number 4.

d) Defining between at least one pair of two adjacent line segments in the list of contiguous line segments, a transition segment, each transition segment being defined based on a desired minimum speed and maximum acceleration at the subsequent line segment, such that the path is defined by the contiguous line segments including at least one pair of line segments which are separated by a transition segment. The path could, as an example, be 1-2-t-3-t-4 meaning that a transition segment is inserted between line segment 2 and 3 and a transition segment is inserted between line segment 3 and 4.

The desired minimum speed and maximum acceleration is by definition herein referred to as a safe zone speed and a safe zone acceleration.

The steps a)-d) could be carried out in the mentioned order, or in a different order. Step b) may, as an example, be carried out after step c), and the steps a)-d) could be carried out as an iterative process where one or more of the steps are re-created after another one of the steps has been carried out.

Further, the controller is programmed to provide the tool commands such that the tool is activated when the adding-position is within a line segment and deactivated when the adding-position is outside the line segment.

Since the transition segment is defined based on a desired minimum speed and maximum acceleration in the subsequent line segment and since the tool is only activated within the line segment, the speed can be increased without risking a reduced quality caused by inaccurate motion characteristics and an undesired acceleration profile.

The apparatus of the present disclosure is applicable to any system where precise and fast positioning of a tool relative to a stage is required, but it is particularly applicable to low cost additive manufacturing systems where the limitation of the mechanics of the machine does not allow for high speeds during print movements especially in cases where the tool follows a complex two dimensional path with sharp turns to define the contours of the object.

The controller could be constituted by a computer processing unit and compatible computer program software enabling the processor to carry out the defined steps. It could also be a computer processing unit which is hard-coded to carry out the steps.

The 3D printing is a process in which material is joined or solidified under computer control to create a three-dimensional object. By definition herein, the process of joining or solidifying material is referred to as "adding" material.

The adding-position is determined by the tool-position of the shape defining structure. To determine the tool commands such that the tool is activated when the adding-position is within the line segment, the controller may be configured to deduce the adding-position from the position of the shape defining structure. Accordingly, the controller may be configured for two-way communication with the motion structure, in which two-way communication the controller receives position information related to the position of the shape defining structure and based thereon determines the adding-position. When the adding position is within a line segment, the tool is activated.

The tool can be powered on and switched off. Due to the characteristics of the involved process, e.g. due to heating or movement of material, there will be a delay from the tool is powered until the material is added. By definition herein, the activated state starts when material is added, i.e. taking into consideration the delay from the time when the tool is powered on to the time when material is added, and that state is therefore subsequent to the step of powering on the tool. Typically, the tool command which shifts between the activated and deactivated states would be a command to power on or switch off the tool, and that command would therefore have to be provided the delay time prior to the desired time of activation or deactivation. In one embodiment, the controller is configured to read a configuration file specifying the delay and calculate the tool command based on the delay to obtain switching on in order to match the activation at the start of a line segment.

In one embodiment the printer is configured for extrusion based AM technology in fused deposition modeling. In this embodiment, the tool forms an extruder in which a filament or plastic rod is melted while being conveyed by a motor system. In this embodiment, the tool-position is the position of the nozzle of the extruder structure, the shape defining structure is the nozzle of the extruder, and the motion structure is the motor structure of the printer which places the nozzle in the position where the addition of material is to take place.

In one embodiment the printer is configured for selective laser sintering (SLS) or selective laser melting. In this embodiment, the tool forms a laser and a mirror for guiding a laser beam over powder to be melted or sintered. The mirror is moved by a motor system. In this embodiment, the tool-position is the position of the mirror, the shape defining structure is the mirror, the adding-position is where the laser influences the powder, and the motion structure is the motor structure of the printer which places the mirror in the tool-position.

In one embodiment the printer is configured for electron beam melting (EBM). In this embodiment, the tool forms an electron emitting structure and an antenna structure for guiding a beam of electrons over powder to be melted. The antenna is controlled by an electronic system. In this embodiment, the tool-position is the position of the antenna, the adding-position is where the electron beam influences the powder, and the motion structure is the electronic system controlling the antenna.

In one embodiment the printer is configured for Stereolithography (SLA). In this embodiment, the tool forms a laser and a mirror for guiding a laser beam over the liquid polymer to be cured. The mirror is moved by a motor system. In this embodiment, the tool-position is the position of the mirror, the adding-position is where the laser influences the liquid polymer, and the motion structure is the motor structure of the printer which places the mirror in the tool-position. If the SLA process is based on UV hardening, the tool-position could be the position of an UV lamp, the adding-position is where the light from the lamp influences the liquid polymer, and the motion structure is the motor structure of the printer which places the UV lamp in the tool-position.

The safe zone speed and the safe zone acceleration could be expressed e.g. as a percentage of the maximum speed and acceleration obtainable with a specific printer. The safe zone speed is particularly a minimum speed which is considered allowable during adding of material, and the safe zone acceleration is particularly a maximum acceleration considered allowable during adding of material. In one example, the safe zone speed could be expressed as between 40 and 100 pct. of the maximum speed for the printer and the safe zone acceleration could be expressed as 0-40 pct. of the maximum acceleration for the printer.

The controller may contain a definition of at least one safe zone, the safe zone forming a geometrical boundary within which the minimum speed and the maximum acceleration should be complied with. The safe zone could be defined in a configuration file which is accessible for the controller such that it can be redefined. The definition of the safe zone could e.g. be made based on the mechanical condition of the printer, the need for speed versus the need for accuracy or other parameters of the process.

The transition segments may particularly define a combined speed and acceleration profile. In one example, the combined speed and acceleration profile is constituted by a ramp up or a ramp down profile. By ramp up profile is herein meant, step, linear, s-curve, or exponential or sinusoidal acceleration profiles of any kind.

The transition segment could be defined based on the desired minimum speed and maximum acceleration by:
receiving a motion structure profile defining the ability of the motion structure to accelerate and decelerate,
defining a necessary length of the transition segment by comparing the ability of the motion structure to accelerate and decelerate with a desired minimum speed in the line segment subsequent to the transition segment, and
defining the transition segment based on the necessary length.

Accordingly, the controller may initially consider a minimum speed and a maximum acceleration which is considered to be allowed when the shape defining structure follows the path, i.e. how fast the adding-position moves. To obtain movement within the boundary of this minimum speed and maximum acceleration, the controller may calculate a length of the transition segment which is needed to accelerate the motion structure prior to entering the adding-position.

The controller could be configured to define a limit which limits the movement of the motion structure, and to identify if a limit is reached during movement of the shape defining structure along the path. The limit could be caused by what is herein referred to as a hard collision which means a physical collision between a part of the printer and the object being printed or a "collision" with a limit of the motion structure, i.e. that a limit in a bearing structure, in a linear actuator or similar structure is reached. The limit could also be caused by what is herein referred to as a soft collision which means that the movement collides with the object which is printed based on process related aspects—e.g. that the already printed parts are melted or destroyed by the tool.

In this embodiment, the controller could be configured to carry out at least one of the following activities in response to identification of the limit being reached:
 a) Collision could be avoided by changing a distance between the tool and the stage by lifting the tool away from the object during the movement along the path. Typically, this is done by manipulating the z coordinate of the tool path during the movement.
 b) Collision could be avoided by changing the order of the line segments. In order to obtain a short or fast execution, the order of the line segments could be 1-2-3-t-4-5, and this order could be changed e.g. to 4-5-2-1-t-3 to thereby avoid the collision.
 c) Collision could be avoided by changing a transition segment. This relates to creating the transition segments with a different shape.

The controller may be configured to receive geometry data defining the shape of at least a part of the printer and to foresee a hard-collision by carrying out a collision simulation in which movement of the shape defining structure along the path is simulated while considering the shape data and the geometry data, and wherein the controller is configured to define the limit based on the collision simulation. By collision simulation, is herein considered that the adding-position is moved around the path virtually while potential hard-collisions are observed.

The controller could be configured to receive kinematic data defining kinematic capabilities of the motion structure and to foresee a kinematic-limit by carrying out a kinematic simulation in which movement of the shape defining structure is simulated along the path while considering the shape data and the kinematic data, and wherein the controller is configured to define the limit based on the kinematic simulation. By kinematic simulation, is herein considered that the adding-position is moved around the path virtually while potential reaching of kinematic limits are observed.

The controller could be configured to receive process data defining a process characteristics related to the process by which the tool adds material to the layer, and to foresee a soft-collision by carrying out a soft-collision simulation in which movement of the shape defining structure along the path is simulated while considering the process data and the shape data to identify a problem related to the movement of the shape defining structure in consideration of the process characteristics, and wherein the controller is configured to define the limit based on the process simulation.

The order of the line segments could be defined by evaluating how long time it will take for the motion structure to make the adding position follow the path for different line segment orders and by choosing an order providing the shortest duration. In this embodiment, the controller could be configured to compare different orders. By way of example, the order 1-2-3-4 could take 5 seconds to execute and the order 3-2-4-1 could take 3 seconds, and the controller could be configured to generate such comparable combinations and select the order providing the most promising solution considering the time it takes to execute the final path. Particularly, the controller could be configured to establish different orders in the final path, i.e. including the transition segments and to select the one being fastest.

The tool can be powered on and switched off, and typically, the characteristic of the process defines a delay from a point in time where the tool is powered on until the material is added. The controller may be configured to define such a delay and to provide the tool commands such that the tool is powered on while the tool-position is within a transition segment. Particularly, the controller may be configured to use the delay to the advantage that the actual adding begins exactly at the start of the line segment. For that purpose, the controller may subtract the delay from a starting time where the adding position reaches the line-segment and provide the tool command to power on the tool at the time equal the starting time minus the delay.

The controller could be configured to compare a first direction of one line segment in the list of contiguous line segments with a second direction of a subsequent line segment in the list of contiguous line segments and to provide an angle between the first direction and second direction, and to define a transition segment between the line segments if the angle exceeds a predefined angle value. For this purpose, the controller could be configured to receive a configuration-data-file defining the angle value.

The controller could be configured to define the transition segment by defining at least an acceleration zone of the transition segment and a subsequent dissipation zone of the transition segment, and wherein the controller is configured to define the acceleration zone as a zone where the motion structure accelerates or decelerates the shape defining structure and to define the dissipation zone as a zone where the motion structure provides constant speed to the shape defining structure and where the acceleration or deceleration in the preceding acceleration zone is simulated to cause vibration of the shape defining structure.

The controller could be configured to simulate whether the acceleration or deceleration in the preceding acceleration zone will cause vibration of the shape defining structure by comparing the acceleration or deceleration in the preceding acceleration zone with a structure-data-file defining a rigidity of the shape defining structure or a component attached to the shape defining structure.

In a second aspect, the disclosure provides a method for printing a 3D object based on a computer model by use of a printer comprising:
a tool configured to shift between an activated and a deactivated state based on a tool command, the tool being configured to add material to an adding-position in a layer of the object in the activated state, where the adding-position is determined by a tool-position of a shape defining structure;
a stage arranged to support the layer of the object;
a motion structure configured to receive motion commands and based thereon to define the shape of the layer by movement of the shape defining structure; and
a controller configured to communicate with the tool and with the motion structure and being programmed to receive shape data defining the shape of a layer of the object, to provide a path based on the shape data, to provide motion commands for the motion structure such that the shape defining structure follows the path, and to provide tool commands based on the path,
the method comprising the steps of:
defining, based on the shape data, a plurality of line segments;
defining start points and end points for each line segment defining an order of the line segments to thereby define a list of contiguous line segments; and
defining between at least one pair of two adjacent line segments in the list of contiguous line segments, a transition segment, each transition segment being defined based on a desired minimum speed and maximum acceleration at the subsequent line segment, such that the path is defined by the contiguous line segments including at least one pair of line segments which are separated by a transition segment.

The method further comprises the step of providing motion commands for the motion structure such that the shape defining structure follows the path and providing tool commands by which the tool is activated when the adding-position is within a line segment and deactivated when the adding-position is outside the line segment. Accordingly, the method results in the making of an object at a high speed due to the segmentation of the path in line segments and transition segments.

The method according to the second aspect of the disclosure may generally comprise any of the steps implicit in the printer according to the first aspect of the disclosure.

In a further aspect, the invention provides a controller for a printer and having the feature described for the controller of the printer according to the first aspect.

LIST OF DRAWINGS

Figure 2:
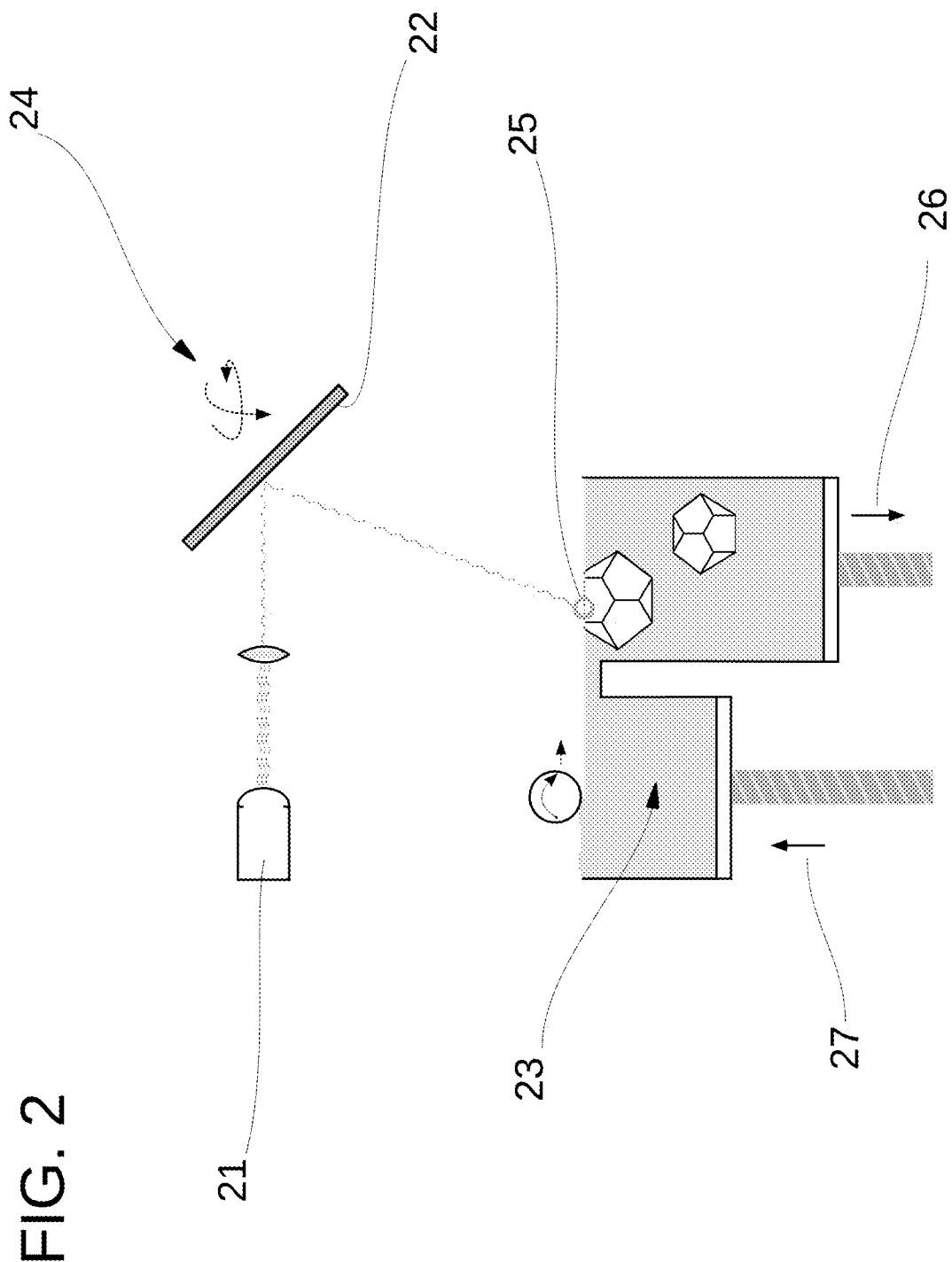
Figure 3:
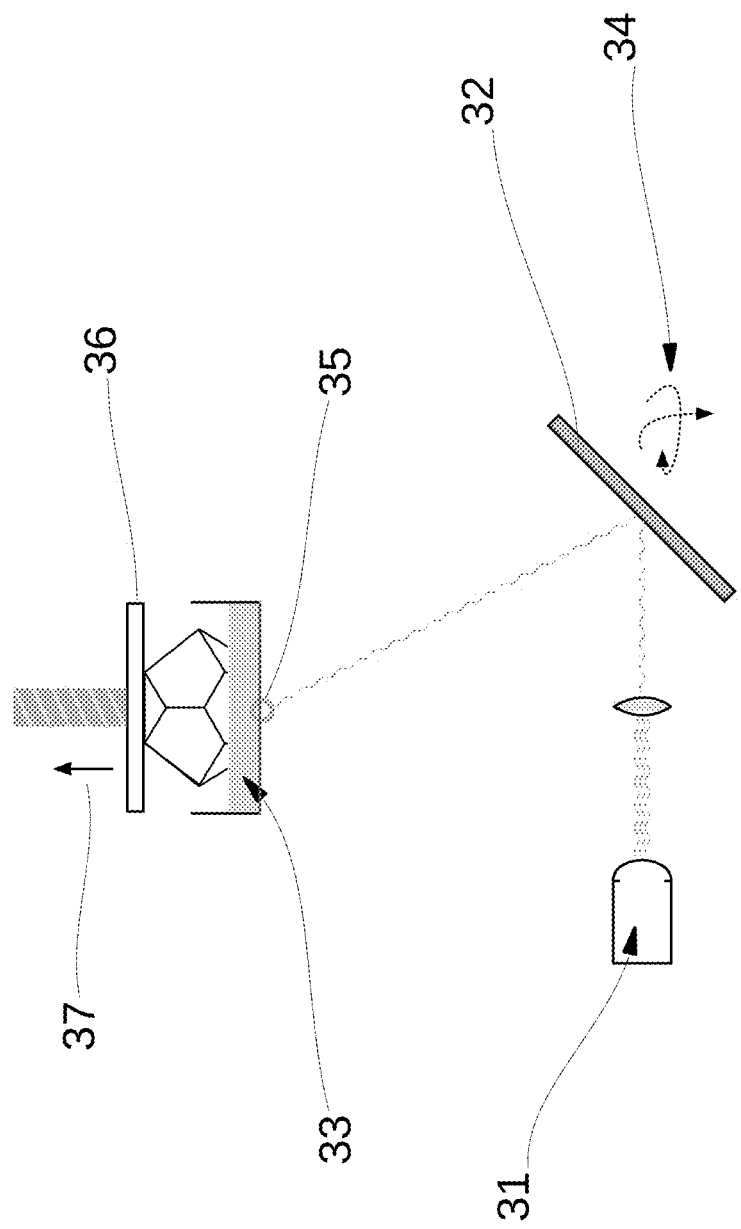
Figure 4:
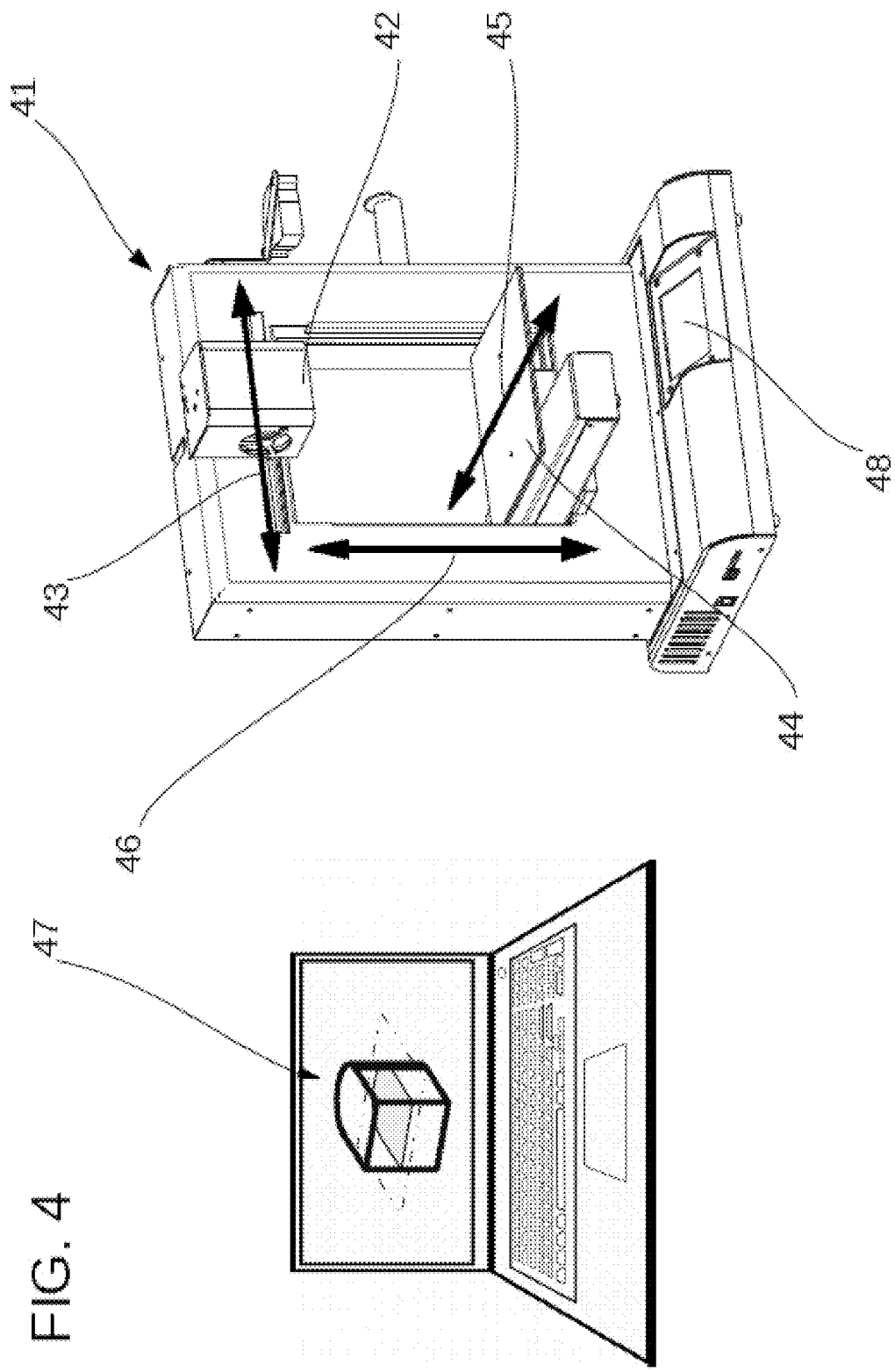
Figure 5:
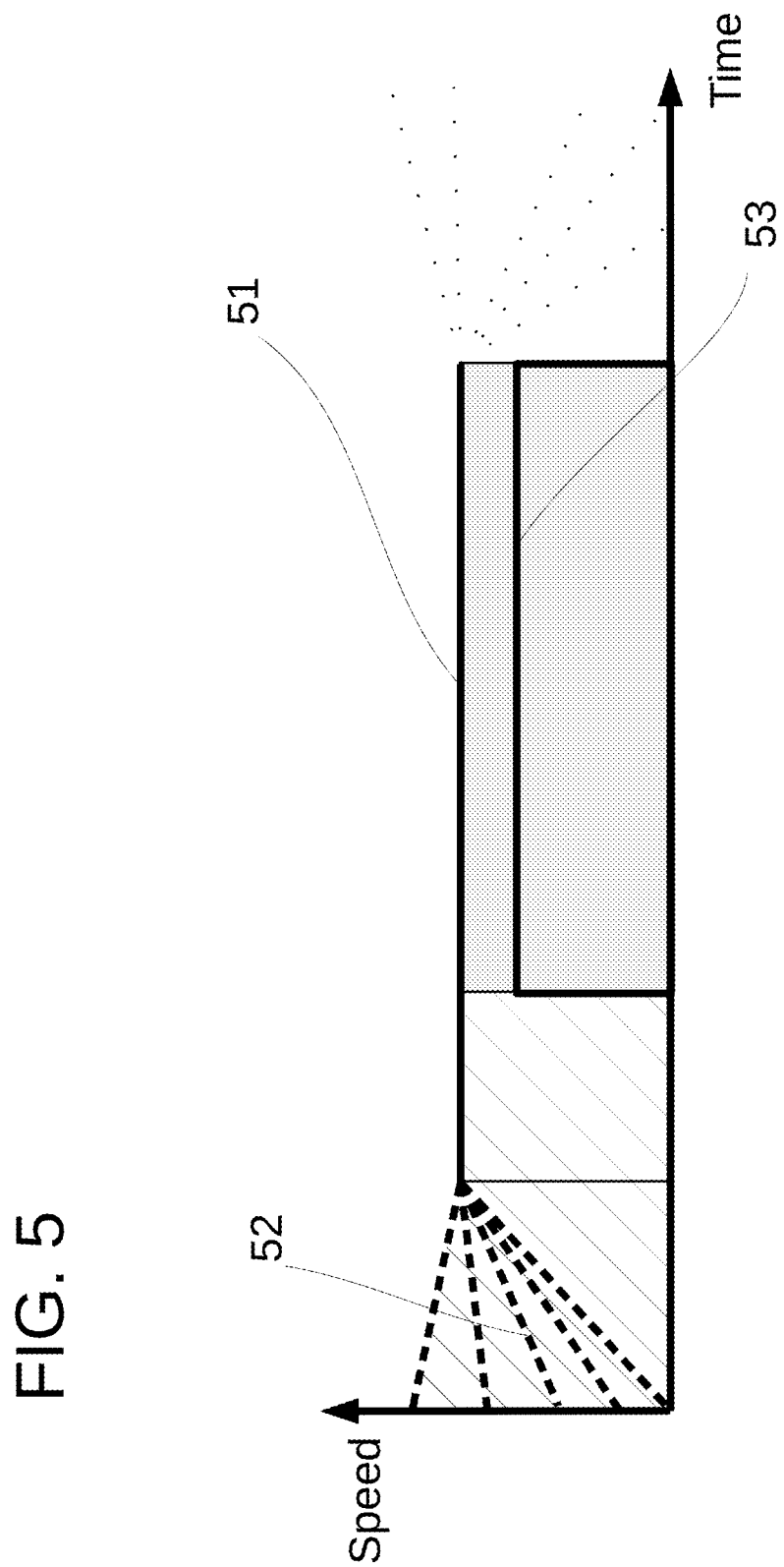
Figure 6:
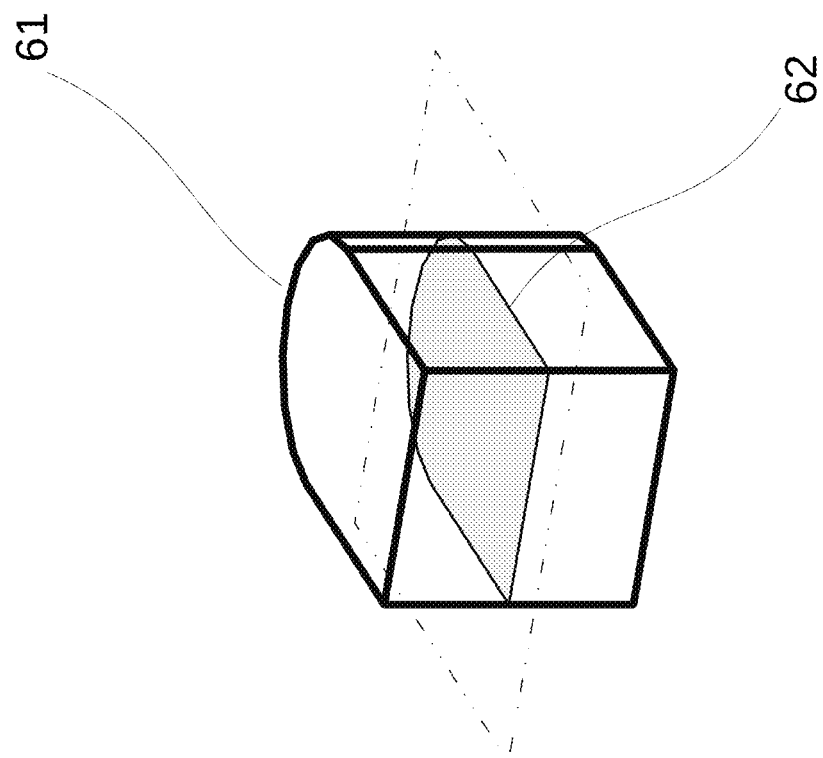
Figure 8:
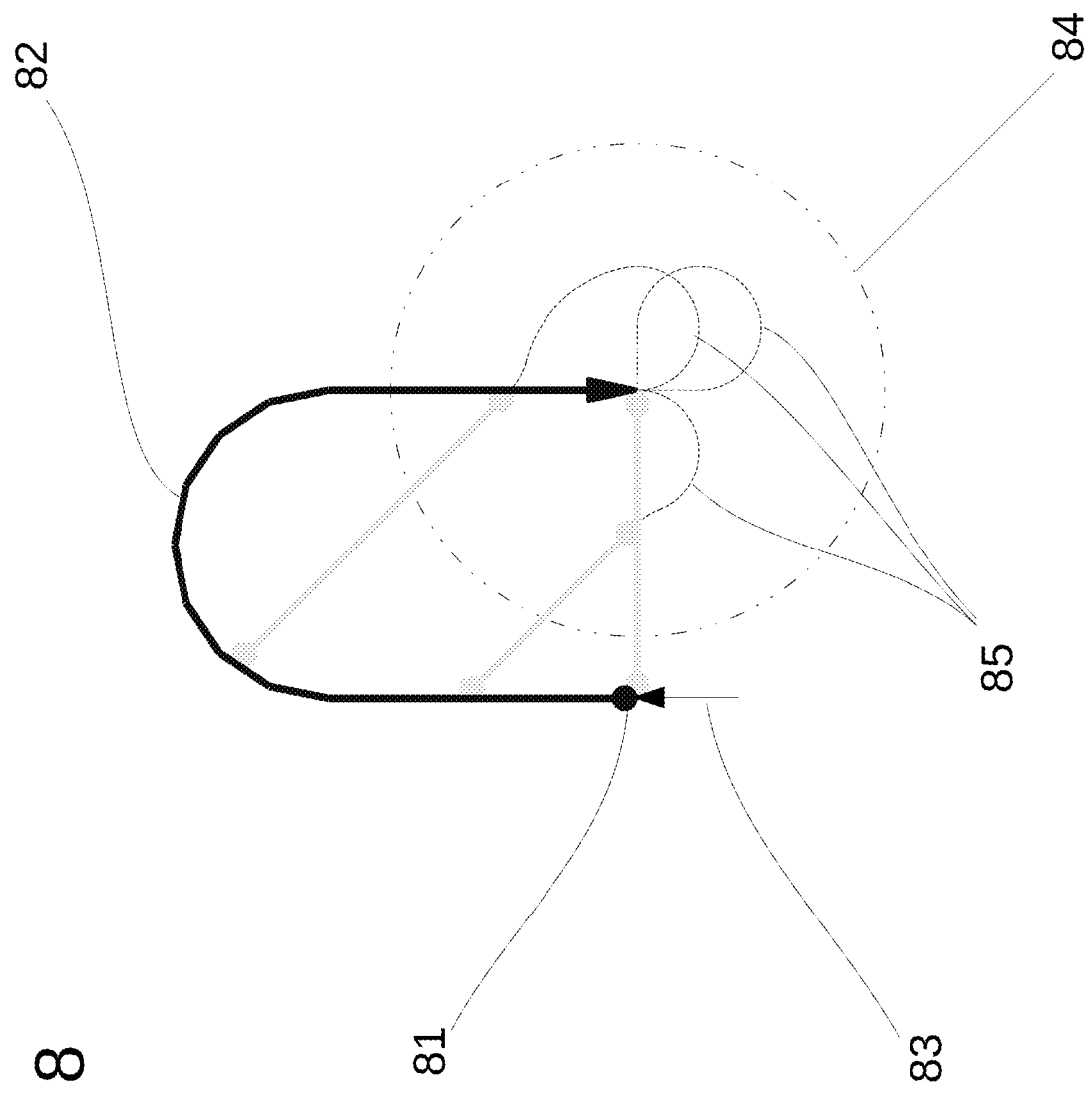
Figure 9:
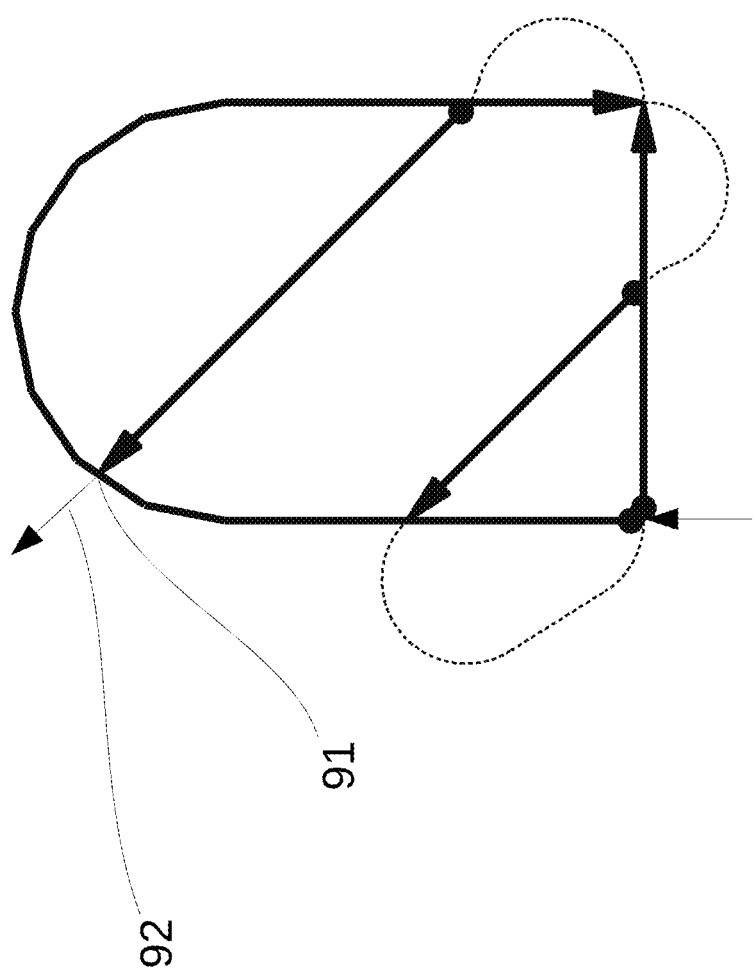
Figure 10:
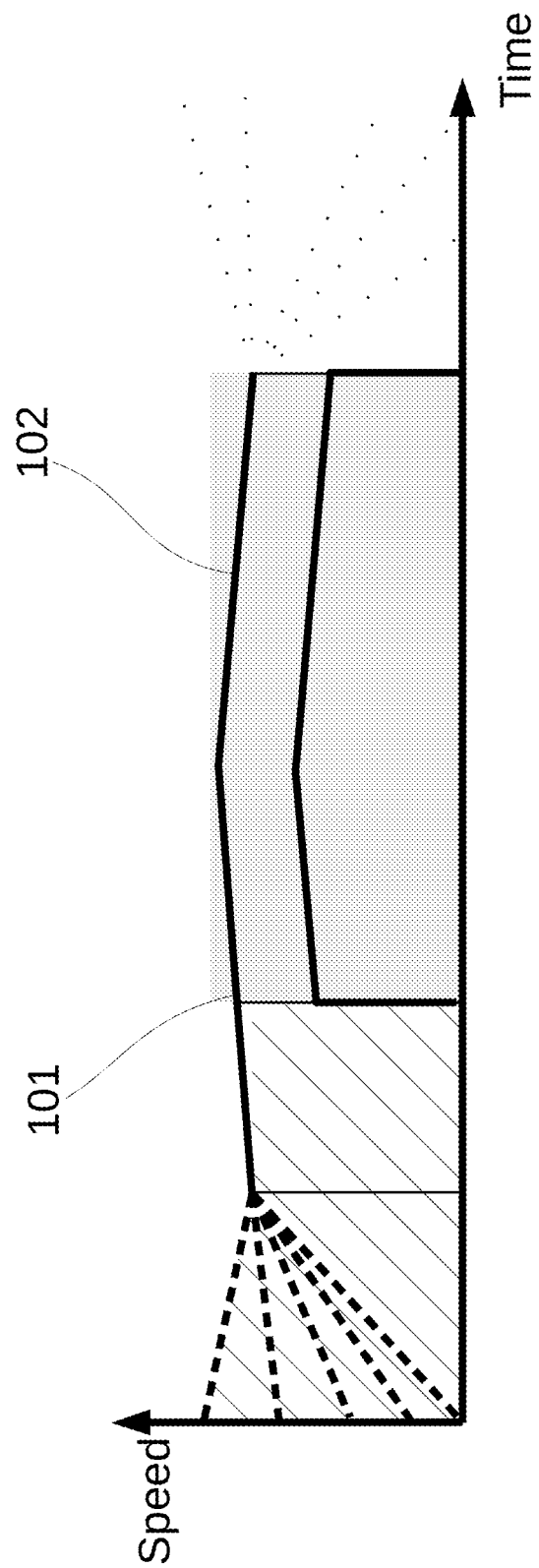
Figure 12:
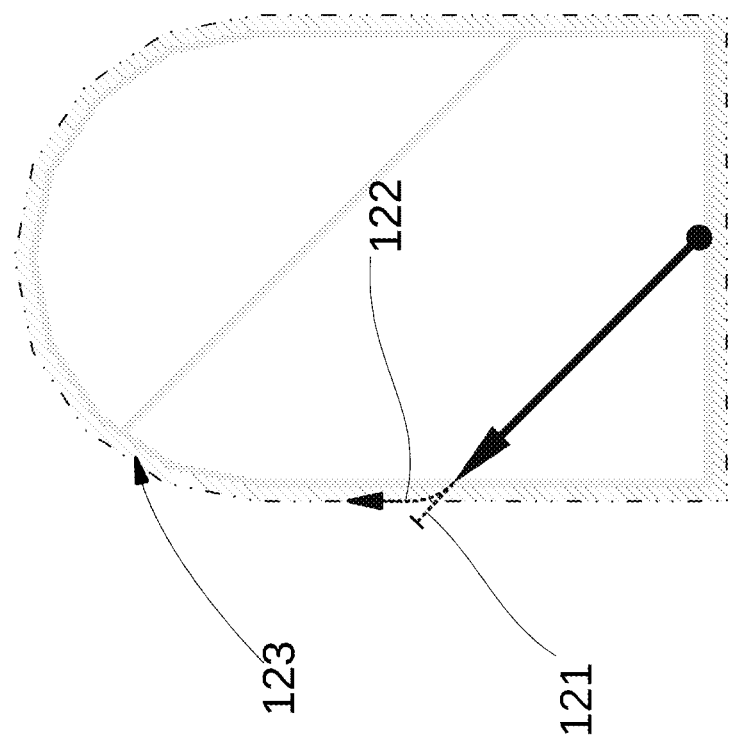
Figure 13:
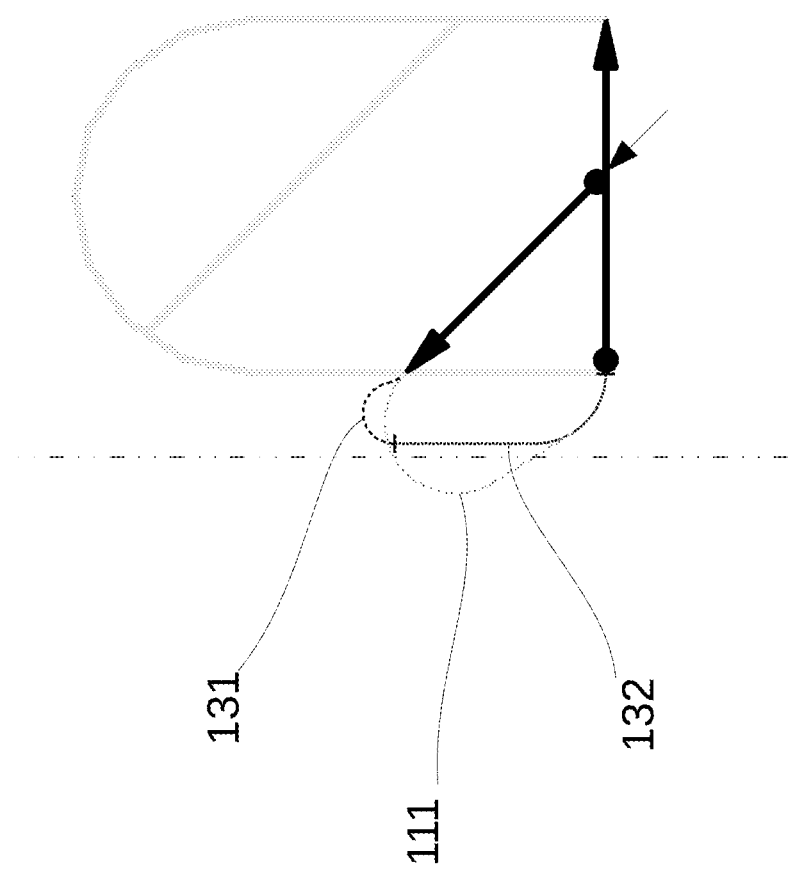
Figure 14:
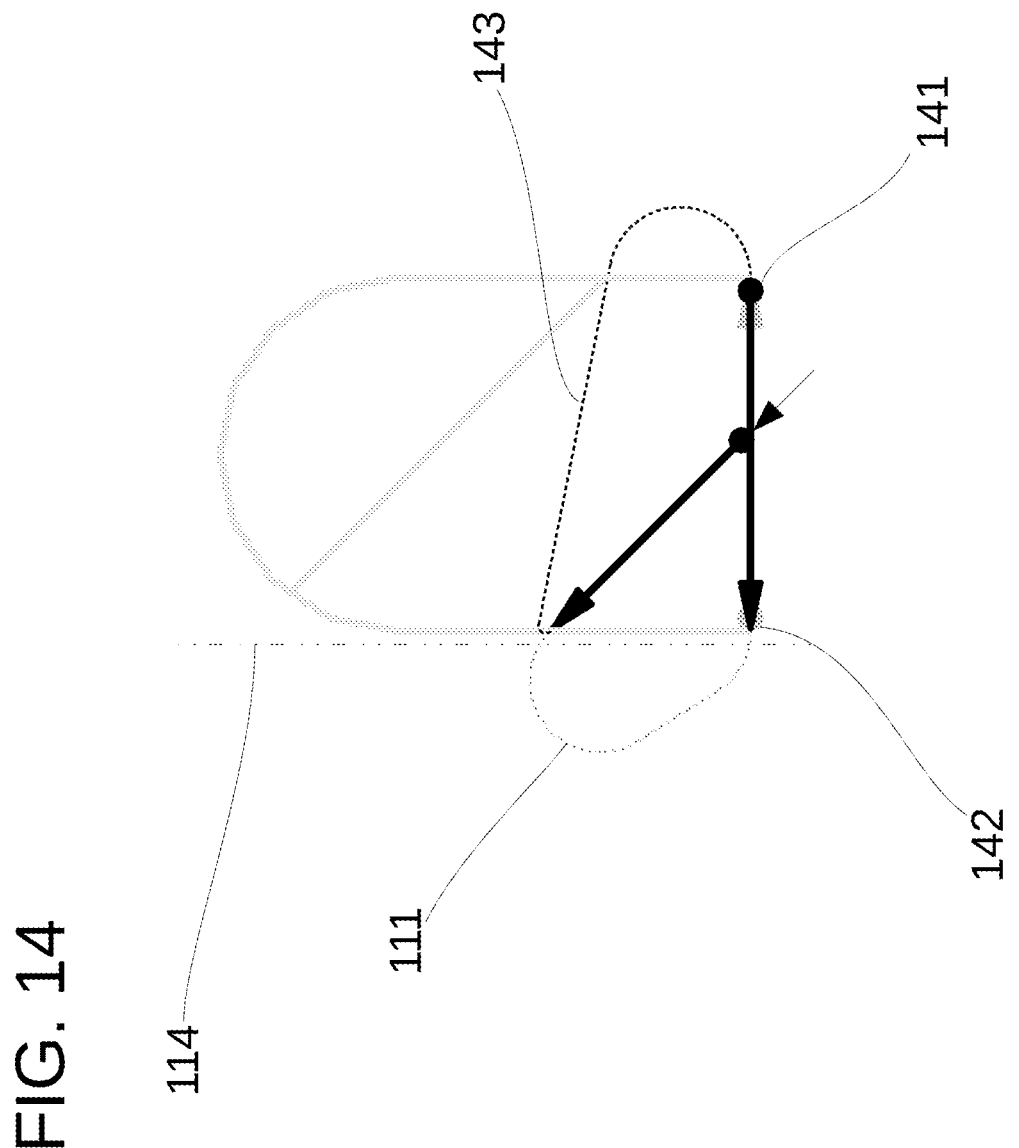
Figure 15:
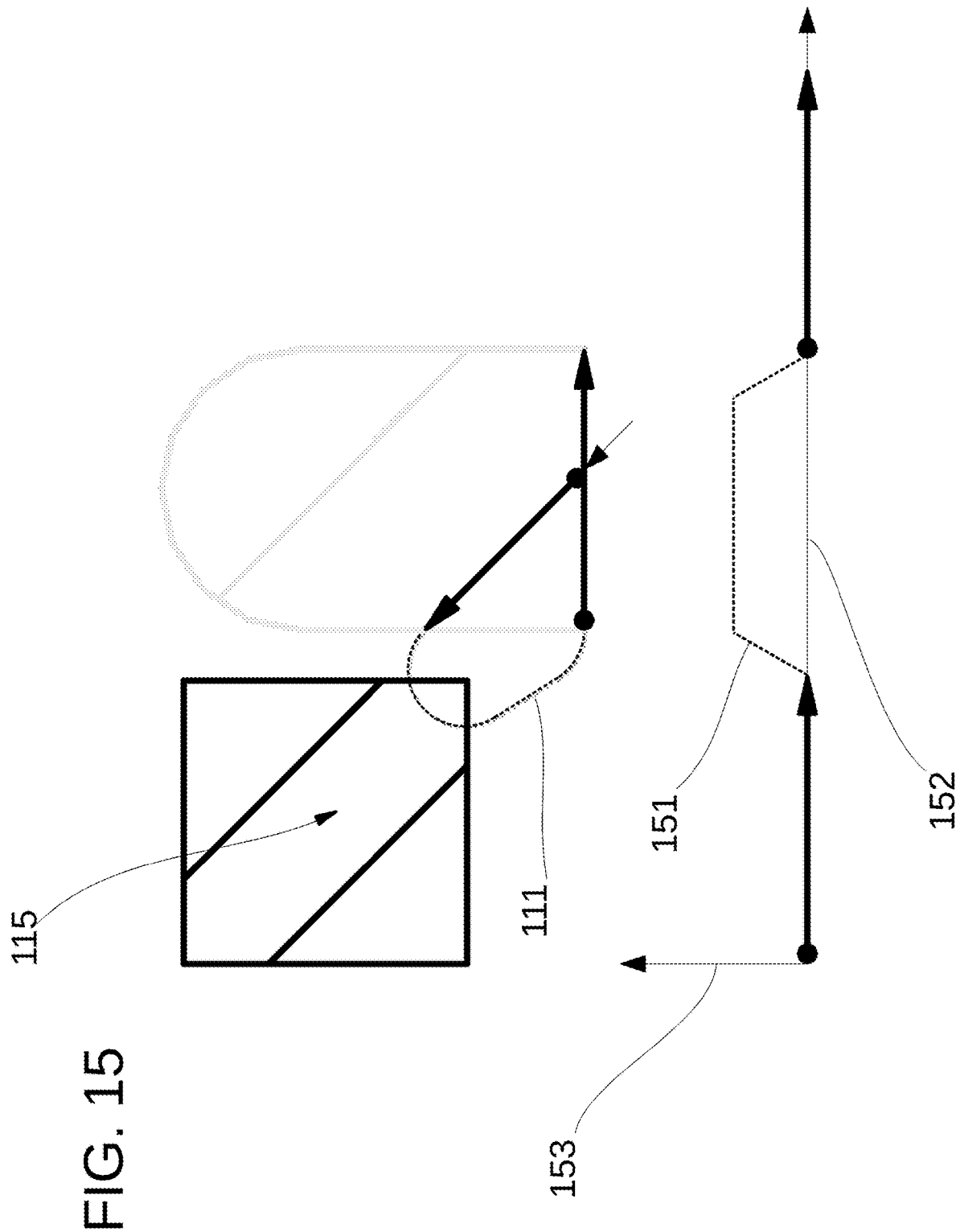

In the following, the disclosure will be explained in further details with reference to the drawings in which:

FIG. 1 illustrates an FDM printer;
FIG. 2 illustrates an SLS printer;
FIG. 3 illustrates an SLA printer;
FIG. 4 illustrates a specific embodiment of the invention;
FIG. 5 illustrates the safe zone concept;
FIG. 6 illustrates slicing of an object;
FIG. 7 illustrates the generation of line segments from slices;
FIG. 8 illustrates generation of transition segments;
FIG. 9 illustrates a completed path;
FIG. 10 illustrates adding additional acceleration during the safe zone;
FIG. 11 illustrates different types of collision;
FIG. 12 illustrates the buffer zone concept;
FIG. 13 illustrates collision avoidance via transition segment modification;
FIG. 14 illustrates collision avoidance via line segment re-ordering;
FIG. 15 illustrates collision avoidance via tool lifting; and
FIG. 16 illustrates tool activation delay compensation.

DESCRIPTION OF EMBODIMENTS

It should be understood that the detailed description and specific examples, while indicating embodiments of the invention, are given by way of illustration only, since various changes and modifications within the spirit and scope of the invention will become apparent to those skilled in the art from this detailed description.

The method and apparatus of the present disclosure is applicable to any system where precise and fast positioning of a tool relative to a stage is required, but it is particularly applicable to low cost additive manufacturing systems where the limitation of the mechanics of the machine does not allow for high speeds during print movements especially in cases where the tool follows a complex two dimensional path with sharp turns to define the contours of the object.

FIG. 1 illustrates an extrusion based printer (FDM). The illustrated printer comprises a filament supply 1 in the form of a spool of thermo-polymer filament. The filament 2 is supplied by a feeding motor (not shown) to the extruder 3. The feeding motor is controlled by a tool command. The extruder 3 comprises a nozzle 4 and an electrical heater (not shown). The heater is also controlled via the tool command. In this embodiment, the tool is constituted by the filament supply and the extruder including the nozzle and heater, and the shape defining structure is the nozzle. The extruder 3 is fixed to a motion structure which can move the extruder, heater, and nozzle in two directions of a Cartesian space illustrated by the arrow 5. When the nozzle is moved in accordance with a path defined from the slice. The shape defining structure of the tool, i.e. in this case the nozzle 4, has a tool position, and the tool position determines the corresponding adding-position 6 where the material is added and where the material therefore defines the layer of the object when the tool is in the activated state.

Due to the time delay which is implicit in the feeding of the filament and the time delay which is implicit in the heating, the feeding motor and the nozzle heater must be powered on prior to the point in time where the tool has to be in the activated state. In this embodiment, the mentioning of the tool being powered on implies powering at least one of the feeding motor and the heater on. In an advanced embodiment, at least one of the heater and feeding motor is controlled between different speeds or heat intensities to thereby control the deposition rate of the material.

When one layer is finished, the stage 7 is moved downwards as indicated by the arrow 8.

FIG. 2 illustrates an SLS printer in which a spherical polymer or metal powder is sintered by the light from a laser. The printer comprises a laser source or lamp 21, a mirror 22 which directs the laser beam into the adding-position 25 in the pool of polymer 23. The mirror constitutes a part of the tool, namely the shape defining structure, and the tool position is the position of the mirror which is controlled by the motion structure based on motion commands. The motion structure is illustrated by the arrows 24.

The tool position defines the adding-position. The stage is constituted by the pool 23 of the material to be sintered.

When a layer of powder has been sintered, the stage is moved downwards by a manipulator illustrated by the arrow 26, and to provide an even level of the powder in the pool, the level is compensated by a manipulator moving upwards, illustrated by the arrow 27. Subsequently, a new layer of powder is sintered.

FIG. 3 illustrates an SLA printer which in many ways corresponds to the SLS printer. The SLA printer comprises a laser source or lamp 31 and a mirror 32 directing the laser beam to the adding-position 35 by changing the tool position via the motion structure 34. The photopolymer liquid resin 33 is hardened by the UV light from the laser. The laser draws the shape of the path which is defined based on the slice and thereby creates a hardened layer. Subsequently, photopolymer liquid is added, and the contour of the subsequent slice is drawn by the laser until the object is created. The stage is constituted by the support plate 36 which is movable by the manipulator illustrated by the arrow 37.

The tool of the SLA and the SLS printer shifts from the activated to the deactivated state by switching the lamp 21, 31 on or off, or by applying a shutter between the lamp and the mirror.

An exemplary device of this kind is a low cost three-dimensional modeling machine (Weistek Ideawerk-Speed) where the tool is an extrusion head as described in U.S. Pat. No. 5,121,329, but, as will be understood by those in the art, the present invention can be applied to a multitude of additive manufacturing machines and methods regardless of the specific tool which is used or the price of the machine without departing from the original spirit and scope of the invention.

FIG. 4 illustrates this printer 41. The tool 42 is, as mentioned, extrusion based. The tool comprises an extrusion head, a material supply and an interface. The tool-position, i.e. the positioning of the extrusion head, is achieved by moving the tool in one direction providing one of the axis 43 (X coordinate) and independently moving the stage 44 in two other directions providing the other two axis 45, 46 (Y and Z) thus providing the ability to control the relative position of the tool in 3 independent dimensions allowing for creation of any arbitrary three dimensional path. The actual positioning is accomplished using timing belts, pulleys, and stepper motors operated in an open loop configuration and constituting the motion structure.

In this particular example, the controller comprises slicing software 47 running on a personal computer and a micro controller 48, built into the printer. The controller is connected to the motion structure which receives motion commands via the interface. Based on the commands, it moves the stage relative to the tool and thereby defines the shape of the layer.

A desired safe zone speed and safe zone acceleration limit is defined in the controller.

FIG. 5 illustrates speed as a function of time. The safe zone speed 51 could be based on other limits of the machine, for example the rate of maximum extrusion 53, while the acceleration limit can be found empirically and considered as a machine constant or it can be a parameter chosen by the user as way to balance speed and quality of the print. The line segments which are to be followed, are to be followed with a speed and acceleration within this limit, and to obtain that safe zone speed and safe zone acceleration in each line segment, the transition 52 between the line segments must be planned. Herein, the segments connecting adjacent line segments are referred to as transition segments.

The slicing software (slicer) generates motion instructions for the micro controller based on the supplied object geometry.

The synchronization of movement of the motors is handled by the micro controller based on information received from the slicer.

The slicer takes the geometry 61 supplied by the user using a 3D file format (for example .stl), containing triangles describing the object, and generates 2D slices 32 of this 3D shape at predefined heights.

Based on these 2D slices 62, a set of line segments 71 are described where material should be deposited in order to create the desired geometry. Accordingly, the adding-position should follow all line segments while the tool is activated.

This process will then define e.g. the outer surface of the object 72 or the inner structure of the object 73. FIG. 6 illustrates a shape of a layer as it is defined in the shape data. FIG. 7 illustrates the corresponding list of contiguous line segments 74 obtained by splitting the shape into a plurality of line segments.

Junctions between adjacent line segments where speed deviations would cause ringing are identified, e.g. by comparing the obtainable speed with the defined safe zone speed, or by evaluating the angle between two line segments connected to the junction. Whenever this situation occurs, a transition segment is defined such that the speed and acceleration can be within the safe zone speed and acceleration in the preceding and subsequent line segments.

For example, in the case of a straight transition segment and a linear acceleration profile, the length of the transition segment would be based on the acceleration rate and the safe zone speed as follows:

$$L = \frac{(v_s)^2}{2a} + d_a$$

Where L is the length of the transition segment, v is the safe zone speed, a, is the chosen acceleration, usually close to the maximum possible acceleration of the machine, and $d_a$ is the length of the dissipation zone required after accelerating with an acceleration.

In the case of a curved transition segment the minimum curvature radius (which in turn sets the maximum acceleration and the length of the zone) of the spline can be calculated as follows:

$$R_{min} = \frac{(v_s)^2}{a_s}$$

Where $R_{min}$ is the minimum curvature radius, $v_s$ is the desired safe zone speed, and $a_s$ is the maximum safe zone acceleration.

By choosing the radius like this, the need for a dissipation zone to be inserted before the next path is eliminated. The reason is that the printer never exceeds safe zone limits during the transition and as such the material deposition can happen immediately after the acceleration is over.

After this step, the two potential beginnings 75 of each line segment are identified and noted.

The first point 81 and line segment 82 are then chosen, and an initial transition segment 83 is defined with a first acceleration and dissipation zone. The acceleration zone is a zone where the motion structure accelerates until reaching the safe zone speed and a zone where the acceleration, once the safe zone speed is reached, is reduced to not exceed the safe zone acceleration.

The slicer then continues to find a next optimal point and connects it by using, for example, a spline based on a set of predefined parameters which can be:

A search radius 84
A minimum curvature radius (or maximum acceleration)
A tangentiality constraint at the beginning and the end of the spline.

The search radius 84 defines the maximum distance at which potential connections are evaluated. This is done to limit the required processing power.

The minimum curvature defines the maximum centripetal acceleration during the transition zone which in turn defines the length of the needed dissipation zone.

The last parameter is a tangentiality requirement at the beginning and at the end of the spline. This could be introduced to ensure a smooth transition from the spline to the subsequent line segment without causing additional vibrations.

Based on these parameters a set of possible routes 85 from an end point of a current line segment to the next beginning point of a subsequent line segment can be planned, and a shortest way from one line segment to the next one can be chosen.

The iteration continues in this manner until all line segments on the layer have been visited at least, but not more than once. The result is a list of contiguous line segments including transition segments arranged between line segments where it is necessary. The resulting path can be completed at the desired speed without causing vibrations exceeding the desired amount under the assumption that material is only added while the adding-position is within the line segments and not outside the line segments.

FIG. 9 illustrates the list of contiguous line segments and transition segments which are added between 4 of the line segments. This is referred to as a path of contiguous line segments.

At the end of the layer 91, a smooth transition between different layers can be achieved by using the same method to connect the last point of the current layer with the first point of the next layer, or a deceleration zone 92 can be inserted if no further layers need to be printed.

At last, the motion instructions are generated and sent to the controller. During this step, further accelerations and decelerations can be inserted, for example during long straight lines constituting line segments. This is done to further speed up the print. FIG. 10 shows an example of this. Instead of keeping a constant speed, a small acceleration 101 and deceleration 102 that meet the safe zone requirements are inserted, while keeping the beginning and the end speeds the same. This means that the paths do not need to be recalculated, but additional print speed can be gained. When using this method, the extrusion may be controlled to match this acceleration to avoid under extrusion.

FIG. 11 illustrates a potential issue that one might encounter during the implementation of the current invention.

Since the transition segments 111 are generated to extend outside the object's boundaries 112, a method to identify and mitigate potential collisions 113 may be implemented. Otherwise, there would be a risk that the generated path would exceed axis travel limitations 114 or cause collision with other, already printed, parts of the object, or collision with another object 115.

Steps may be taken to avoid situations where no potential solution can be found to avoid collision, by limiting where the object can or cannot be placed inside the workspace. FIG. 12 illustrates a safety zone around the object that is used to limit how close the object can be to a limit. Given the speed at the end of the line segment and the maximum acceleration the machine is capable of, it is possible to calculate the distance 121 which is required to slow down to a speed at which the machine is able to make turns at an arbitrary angle or to calculate a radius 122 along which the machine is capable of turning at full speed. By taking the smallest of these values, a "buffer zone" 123 could be generated around each object. The object should then be prevented from being placed closer than this distance to either the axis limits or to another object. This is to prevent situations where it would be impossible to make a path that could safely stop or redirect the tool before crashing.

After this first safety measure, collisions can be avoided by finding all transition segment splines that would go outside the work area of the printer 111. Subsequently, these transition segments are modified to avoid collision. FIG. 13 shows one potential way to do this. In this example, by choosing a sharper minimum corner radius 131 for the spline, the size of the transition segment is reduced, and then the extra vibrations caused by the higher acceleration are compensated for, by extending the dissipation zone 132 of the next line.

Collision avoidance can also be taken into account as one of the parameters when deciding the order in which the line segments should be printed. FIG. 14 shows an example, where, by choosing a different beginning point 141 on the next segment instead of the originally planned one 142, it is possible to make a new transition segment 143 that satisfies al requirements without crossing outside of the axis limits 114, even though it would have been impossible to accomplish this just by modifying the original transition segment 81.

In the case of a contact based material deposition technique such as the extruder in our example another potential type of collision may also be taken into account. During a technique, like FDM printing it is highly undesirable to move the tool over, or close to already printed parts of the object 115. The radiative heat from the tool could cause the already printed parts to re-melt and deform and thereby create a defect in the printed object, causing a "soft" collision, where even though a physical collision might not take place, the print quality is still compromised.

FIG. 15 shows a method to mitigate this problem. When a potential soft collision is detected, the tool is lifted 151 away from the work plane 152 during the transition segments 111, by manipulating its Z coordinate 153 (moving the stage 44 away from the tool 42).

Another practical problem potentially encountered during the implementation of the invention is the requirement to precisely activate and de-active the tool during the beginning and the end of the line segments.

FIG. 16 illustrates a method to match the activation of the tool to the line segment by modulating the activation signal of the tool.

In the case of the exemplary embodiment, the tool is a filament extruder. For a tool like this, after the activation signal 161 is sent it takes considerable amount of time 162 for the filament extrusion 163 to begin, as pressure is needed to be built up inside the nozzle. Likewise, during deactivation, unless the nozzle is physically blocked, the filament continues to ooze out due to gravitational pull, residual pressure, and thermal expansion. Similar delays are also present in the other types of tools used in 3D printing to a different extent.

Apart from using other response improving methods as described in the prior art for example retracting the filament during the transient period, in addition to these techniques the added path in form of the transition segment can also be used to send the activation signal 161 slightly earlier in an attempt to synchronize the activation of the tool with the line segment 164.

The invention claimed is:

1. A printer for printing a 3D object based on a computer model, the printer comprising:
a tool configured to shift between an activated and a deactivated state based on a tool command, the tool being configured to add material to an adding-position in a layer of the 3D object in the activated state, where the adding-position is determined by a tool-position of a shape defining structure;
a stage arranged to support the layer of the 3D object;
a motion structure configured to receive motion commands and based thereon to define the shape of the layer by movement of the shape defining structure; and
a controller configured to communicate with the tool and with the motion structure and being programmed to receive shape data defining the shape of a layer of the 3D object, to provide a path based on the shape data, to provide motion commands for the motion structure such that the adding-position follows the path, and to provide tool commands based on the path;
wherein the controller is configured to define the path by:
defining, based on the shape data, a plurality of line segments;
defining start points and end points for each line segment;
defining an order of the line segments to thereby define a list of contiguous line segments;
defining a transition segment between at least one pair of two adjacent line segments in the list of contiguous line segments, each transition segment being defined based on a desired minimum speed and maximum acceleration at the subsequent line segment, such that the path is defined by the contiguous line segments including at least one pair of line segments which are separated by a transition segment, and
wherein the controller is programmed to provide the tool commands such that the tool is activated when the adding-position is within a line segment and deactivated when the adding-position is outside the line segment;
wherein the controller is configured to define the transition segment by defining at least an acceleration zone of the transition segment and a subsequent dissipation zone of the transition segment;
wherein the controller is configured to define the acceleration zone as a zone, where the motion structure accelerates or decelerates the shape defining structure and to define the dissipation zone as a zone where the motion structure provides constant speed to the shape defining structure and where the acceleration or deceleration in the preceding acceleration zone is simulated to cause vibration of the shape defining structure;
wherein the controller is configured to define the transition segments by:
selecting between defining a straight transition segment or a curved transition segment based on a position of a preceding line segment and a subsequent line segment;
if a straight transition segment is selected, applying a length to the straight transition segment, the length being applied by the equation:

$$L = \frac{(v\_s)^2}{2a + d\_a}$$

where L is the applied length of the straight transition segment, v is a safe zone speed which is defined in the controller, a is an acceleration which is defined in the controller, and da is the length of the dissipation zone required after accelerating in the acceleration zone, and
if a curved transition segment is selected, applying a radius of curvature to the curved transition segment, the radius of curvature being applied by the equation:

$$R\_min = \frac{(v\_s)^2}{a\_s}$$

where R_min is a pre-specified curvature radius, v_s is a safe zone speed defined in the controller, and a_s is a pre-specified safe zone acceleration defined in the controller.

2. The printer according to claim 1, wherein the controller contains a definition of at least one safe zone, the safe zone forming a geometrical boundary within which the minimum speed and the maximum acceleration should be complied with.

3. The printer according to claim 1, wherein the controller is configured to define a limit which limits the movement of the motion structure, and to identify if a limit is reached during movement of the shape defining structure along the path, and
wherein the controller is configured to carry out at least one of the following activities in response to identification of the limit being reached:
a) changing a distance between the tool and the stage;
b) changing the order of the line segments; and
c) changing a transition segment.

4. The printer according to claim 3, wherein the controller is configured to receive geometry data defining the shape of at least a part of the printer and to foresee a hard-collision by carrying out a collision simulation in which movement of the shape defining structure along the path is simulated while considering the shape data and the geometry data, and
wherein the controller is configured to define the limit based on the collision simulation.

5. The printer according to claim 3, wherein the controller is configured to receive kinematic data defining kinematic capabilities of the motion structure and to foresee a kinematic-limit by carrying out a kinematic simulation in which movement of the shape defining structure is simulated along the path while considering the shape data and the kinematic data, and wherein the controller is configured to define the limit based on the kinematic simulation.

6. The printer according to claim 3, wherein the controller is configured to receive process data defining a process characteristics related to the process by which the tool adds material to the layer, and to foresee a soft-collision by carrying out a soft-collision simulation in which movement of the shape defining structure along the path is simulated while considering the process data and the shape data to identify a problem related to the movement of the shape defining structure in consideration of the process characteristics, wherein the soft-collision is defined as a collision of the tool with the 3D object based on process related aspects, and wherein the controller is configured to define the limit based on the process simulation.

7. The printer according to claim 1, wherein the order of the line segments is defined by evaluating a duration of the motion structure to follow the path for different line segment orders and by choosing an order providing the shortest duration.

8. The printer according to claim 1, wherein the tool can be powered on and switched off, and wherein it has a characteristic by which it defines a delay from a point in time where the tool is powered on until the material is added, and wherein the controller is configured to define the delay.

9. The printer according to claim 8, wherein the controller is configured to provide the tool commands such that the tool is powered on while the adding-position is within a transition segment.

10. The printer according to claim 1, wherein the controller is configured to receive a configuration-data-file defining the angle value.

11. The printer according to claim 1, wherein the controller is configured to simulate whether the acceleration or deceleration in the preceding acceleration zone will cause vibration of the shape defining structure by comparing the acceleration or deceleration in the preceding acceleration zone with a structure-data-file defining a rigidity of the shape defining structure or a component attached to the shape defining structure.

12. The printer according to claim 1, wherein the shape defining structure is at least one of the tool and the stage.

13. The printer according to claim 1, wherein the controller is configured for defining a ramp up speed and a ramp down speed for at least one line segment in the path, the ramp up speed and the ramp down speed being defined within a safe zone acceleration limit defined in the controller.

14. The printer according to claim 1, wherein the stage is constituted by a support plate, the support plate being movable by a manipulator;

wherein the tool-position is achieved by moving the tool in a first direction to provide a first axis and by independently moving the stage in a second and third direction to provide a second and third axis.

15. A method for printing a 3D object based on a computer model by use of a printer comprising:

a tool configured to shift between an activated and a deactivated state based on a tool command, the tool being configured to add material to an adding-position in a layer of the 3D object in the activated state, where the adding-position is determined by a tool-position of a shape defining structure;

a stage arranged to support the layer of the 3D object;

a motion structure configured to receive motion commands and based thereon to define the shape of the layer by movement of the shape defining structure; and a controller configured to communicate with the tool and with the motion structure and being programmed to receive shape data defining the shape of a layer of the 3D object, to provide a path based on the shape data, to provide motion commands for the motion structure such that the shape defining structure follows the path, and to provide tool commands based on the path, the method comprising the steps of:

defining, based on the shape data, a plurality of line segments;

defining start points and end points for each line segment;

defining an order of the line segments to thereby define a list of contiguous line segments; and defining a transition segment between at least one pair of two adjacent line segments in the list of contiguous line segments, each transition segment being defined based on a desired minimum speed and maximum acceleration at the subsequent line segment, such that the path is defined by the contiguous line segments including at least one pair of line segments which are separated by a transition segment;

the method further comprising the step of providing motion commands for the motion structure such that the shape defining structure follows the path and providing tool commands by which the tool is activated when the adding-position is within a line segment and deactivated when the adding-position is outside the line segment;

wherein the controller is configured to define the transition segment by defining at least an acceleration zone of the transition segment and a subsequent dissipation zone of the transition segment;

wherein the controller is configured to define the acceleration zone as a zone, where the motion structure accelerates or decelerates the shape defining structure and to define the dissipation zone as a zone where the motion structure provides constant speed to the shape defining structure and where the acceleration or deceleration in the preceding acceleration zone is simulated to cause vibration of the shape defining structure;

wherein the controller is configured to define the transition segments by:

selecting between defining a straight transition segment or a curved transition segment based on a position of a preceding line segment and a subsequent line segment;

if a straight transition segment is selected, applying a length to the straight transition segment, the length being applied by the equation:

$$L = \frac{(v\_s)^2}{2a + d\_a}$$

where L is the applied length of the straight transition segment, v is a safe zone speed which is defined in the controller, a is an acceleration which is defined in the controller, and da is the length of the dissipation zone required after accelerating in the acceleration zone, and if a curved transition segment is selected, applying a radius of curvature to the curved transition segment, the radius of curvature being applied by the equation:

$$R\_min = \frac{(v\_s)^2}{a\_s} \qquad (5)$$

where R_min is a pre-specified curvature radius, v_s is a safe zone speed defined in the controller, and a_s is a pre-specified safe zone acceleration defined in the controller.

\* \* \* \* \*